Nov. 29, 1966   P. G. TODD   3,289,069
PHASE CONTROLLED VOLTAGE REGULATING SYSTEM
Filed July 30, 1962
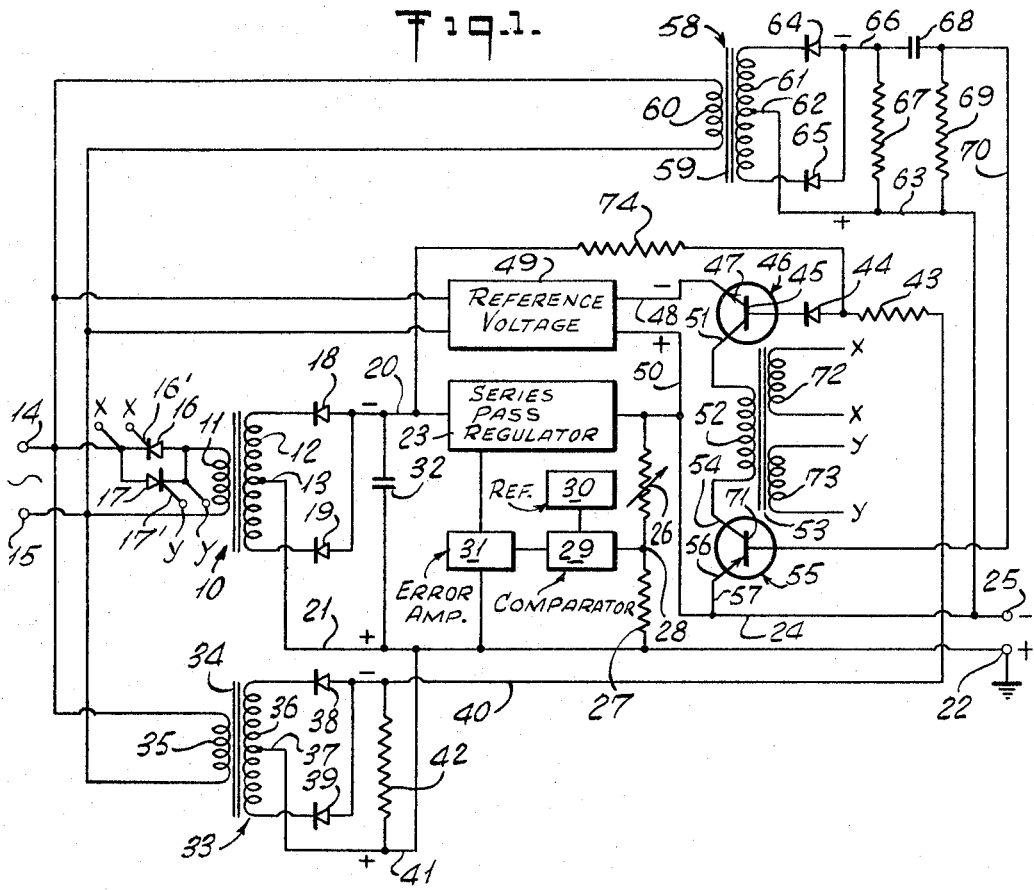
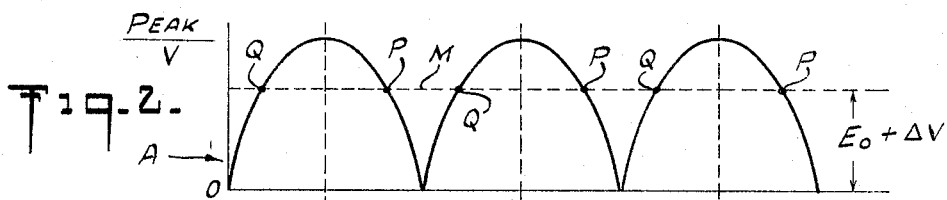
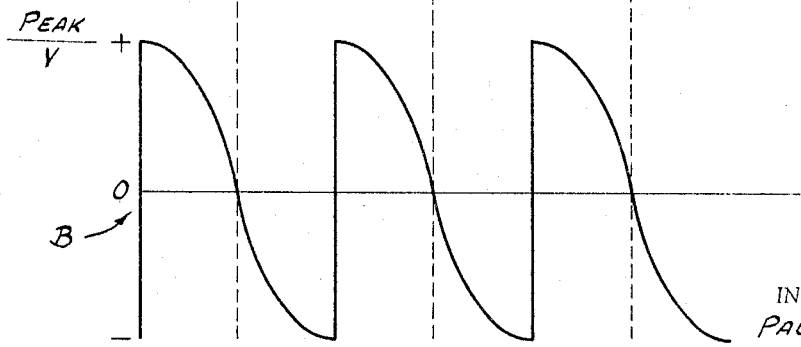
INVENTOR.
PAUL G. TODD
BY
ATTORNEY

United States Patent Office 3,289,069
Patented Nov. 29, 1966

3,289,069
PHASE CONTROLLED VOLTAGE REGULATING SYSTEM
Paul G. Todd, Glen Head, N.Y., assignor to Trygon Electronics Inc., Roosevelt, Long Island, N.Y., a corporation of New York
Filed July 30, 1962, Ser. No. 213,473
5 Claims. (Cl. 321—18)

This invention relates to voltage regulating systems and more specifically to a novel and improved voltage regulator and method of operation particularly useful in cases requiring the generation and control of D.C. power with minimized losses.

The supply and regulation of D.C. power has heretofore presented numerous problems and with the advent of the transistor which requires a relatively low voltage at high current, the problem of providing regulated power supplies has become even more difficult. It has been customary in the design of regulated direct current power supplies to provide a source of direct current and then to effect regulation of the voltage by the utilization of series regulators which may consist of suitable variable impedance devices in series with the supply and means to control these devices in response to either the output current or voltage, whichever is most critical.

When direct current is produced from alternating current by means of an appropriate transformer and rectifiers, means have been suggested for modifying the alternating current voltage applied to the primary of the transformer to avoid substantial losses in the series regulator and avoid the need for large capacity series regulators which are both complicated and expensive. One approach heretofore suggested for the attainment of this end involves the use of a variable transformer operated by a servo device which responds to changes in the output voltage and modifies the alternating current input in a direction to return the output voltage to a normal or predetermined value. While such a structure will function, it acts relatively slowly and would not protect the series regulators in the event of substantial surges. Furthermore, the power transformer for modifying the magnitude of an A.C. voltage to produce a second voltage which when rectified will produce the desired maximum direct current voltage must be designed to handle the total power required to operate the system. Such devices are exceedingly expensive and must be capable of handling a continuous peak load throughout the entire alternating current cycle in much the same manner as in the case of a transformer feeding a resistive load.

This invention overcomes many of the difficulties heretofore encountered in voltage regulators and provides a novel and improved regulating system whereby the voltage delivered to the regulating circuit may be controlled in such a manner as to maintain power losses at a minimum. This materially reduces the need for large capacity series regulators of the type generally utilized for regulating a D.C. current, and affords a considerable improvement in efficiency of operation. In the case of regulating systems including a transformer and rectifiers for conversion of alternating current to regulated direct current, this invention affords an improved method and apparatus for controlling the A.C. power applied to the transformer so that the transformer will be required to furnish power to associated regulating means only during selected portions of each cycle necessary to provide a minimum D.C. voltage to the series regulating means in order to obtain a D.C. output voltage of the desired magnitude. Actual tests of this invention when used for instance with a power supply transformer have indicated that such transformer can be reduced to approximately one-half the volume that would be required in connection with known regulators for the conversion of A.C. to D.C. and regulation of the D.C.

Furthermore, the series pass regulator which controls the rectified direct current can also be made considerably smaller since it will be operated at or near a minimum impedance value with the result that power dissipation will be maintained at minimum. Since transistors are frequently used as series pass regulators and inasmuch as the power dissipated by a transistor is a critical factor in determining its load capacity, the operation of a transistor at a minimum impedance will therefore greatly increase its current carrying capacity.

Another object of the invention resides in the provision of a novel and improved regulator characterized by its relatively small size, high efficiency and low cost.

The above and other objects of the invention will become more apparent from the following description and accompanying drawings forming part of this application.

In the drawings:

FIGURE 1 is a circuit diagram of one embodiment of a regulator in accordance with the invention.

FIGURE 2 illustrates two voltage curves which explain certain aspects of the operation of the regulator shown in FIG. 1.

As pointed out above, the regulator in accordance with the invention contemplates an improved mode of regulation. This improved regulator may be used with a series pass regulator which includes a variable impedance such as a transistor in series with the rectified direct current and which is actuated by either the voltage or the current applied to the load so that it will function to maintain either one or both of these factors at a predetermined magnitude. When utilizing the improved regulating method and apparatus with a power transformer, the latter is energized during selected portions of the alternating current cycle necessary to deliver the desired power to the filtering system and thus to the load in order to maintain the output voltage or current as the case may be at or near the selected magnitude. By coordinating the operation of both regulating means the sizes of the components can be materially reduced and a substantial improvement in efficiency obtained. As a result the power supply will have improved stability and relatively light weight, will dissipate considerably less heat and will afford a high degree of reliability even under adverse operating conditions such as high ambient temperature and the like.

Referring now to the drawings, the primary power supply transformer is generally denoted by the numeral 10 and it includes a primary 11 and a secondary 12 having a centertap 13 thereon. Alternating current applied to the terminals 14 and 15 is fed to the primary 11 through a pair of silicon controlled rectifiers 16 and 17 connected in back-to-back relationship between the terminals 14 and the primary 11. The alternating current voltage produced in the secondary 12 is rectified by silicon rectifiers 18 and 19, each connected at one side to one end terminal of the winding 12 and having their other sides connected together and to the conductor 20. The centertap 13 is connected to the conductor 21 which in turn is connected to one output terminal 22 of the supply. In the instant embodiment of the invention the negative side of the generated direct current is applied to the conductor 20, while the positive side is applied to the conductor 21. The conductor 20 is connected to the input of the series pass regulator 23 and the output is connected via conductor 24 to the output terminal 25.

Operation of the series pass regulator to control the voltage appearing across the terminals 22 and 25 may be effected by any suitable sensing circuit and in the present embodiment of the invention, this sensing circuit includes a voltage divider connected between the conductors 24 and 21 and comprising an adjustable resistor 26 in series with a resistor 27. The junction 28 of these two resistors is connected to a comparator 29 such as a transistor or the like. A fixed reference voltage such as a battery power supply or the like generally denoted by the numeral 30 is fed to the comparator 29. An error voltage produced by the comparator 29 is fed to an error amplifier 31 connected between the conductor 21 and the series pass regulator. The error signal from amplifier 31 modifies the impedance of the series regulator to automatically correct the output voltage at terminals 22 and 25 and maintain it within predetermined narrow limits notwithstanding load changes or changing in the alternating current supply.

The control circuit with the series pass regulator may of course take any desirable form, and one regulating circuit that may be utilized is illustrated and described in my prior application for United States patent, Serial No. 81,978, filed January 11, 1961 entitled Voltage Regulator Power Supply.

In order to maintain the power loss in the series pass regulator at or close to a minimum value, this invention provides means for controlling the magnitude of the voltage applied to the filter condenser 32 connected between the conductors 20 and 21 so that the voltage impressed across the condenser is approximately equal to the selected supply voltage appearing across the terminals 22 and 25 plus the minimum IR loss in the series regulator 23. This loss is necessitated because of the impedance variation required in the regulator to compensate for the ripple voltage, the drop in the impedance device itself when in a saturated condition, and other IR drops that may be inherent in the device.

It has been found possible to provide regulated direct current power of the order of two kilowatts and even higher by limiting the total charge on the condenser 32 to a value which at least equals the regulated D.C. voltage from the supply plus the loss in the series pass regulator. This holds notwithstanding the adjusted supply voltage. It has also been found that through a novel and improved control system, the energy fed to the primary 11 of the transformer 10 can be controlled automatically in response to the regulated D.C. output voltage so that the charge applied to condenser 32 will always be equal to or only slightly greater than the sum of the regulated output voltage (notwithstanding its adjusted value) and the loss in the series pass regulator 23. In so doing, it is possible to reduce the total volume of the power transformer 10 for a given load to approximately one-half the volume otherwise required and since the series pass regulator 23 is then required to regulate over a relatively narrow range, its impedance can be maintained at or near its minimum impedance. This reduces the power loss in the series regulator and enables lower capacity transistors to be used for the control of large loads. As pointed out above, it is known that the critical capacity of a transistor is determined by the power it must dissipate. Thus, even if the current through the transistor is high, if its impedance is maintained at a relatively low value, the transistor can operate to control safely relatively large currents.

In accordance with the illustrated embodiments of the invention, the D.C. voltage periodically applied to the condenser 32 by means of the transformer 10 and rectifiers 18 and 19 is effected by the utilization of silicon controlled rectifiers 16 and 17. These rectifiers are normally non-conductive and will become conductive when an appropriate signal is applied to the control electrodes 16' and 17' respectively. Since these rectifiers are connected in back-to-back relationship, they will operate to pass alternate half cycles, and if these rectifiers are tripped in a predetermined manner, they will operate to pass only a portion of each half cycle. This can be explained more readily in connection with curve A of FIG. 2 which represents the rectified voltage applied to the condenser 32. Let it be assumed that the rectifiers 16 and 17 are to be operated or fixed at a point on each half cycle of the alternating current so that a voltage will be applied to the conductor 20 equal to $E_0$ (the output voltage of the regulator supply which appears across terminals 22 and 25) plus V (the minimum voltage loss in the series pass regulator 23). This voltage is represented by the dotted line M in FIG. 2 and it will be observed that this line intersects each rectified half cycle at two points, Q and P. If the rectifiers were tripped at the point Q on each half cycle, the condenser 32 would nevertheless be charged to the peak voltage and the series pass regulator would then have to reduce that peak voltage to the adjusted output voltage appearing across terminals 22 and 25.

Since it is important in accordance with the invention to restrict the total charge on the condenser 32 to $E_0$ plus $\Delta V$, firing of the rectifiers is delayed on each half cycle until the rectified voltage reaches the point P. Actual tests have found that in so doing, the transformer 10 is required to handle only that power necessary to supply the power demand to the load even in the case where the regulator is adjusted to put out peak voltage and the point P is coincident with the peak of each rectified half cycle. Since the flux density in the core is reduced by a factor of 2 by reason of this system, the volume of the transformer can be reduced by approximately 50% which materially reduces both the weight and cost of the unit.

Control of the rectifiers 16 and 17 in the manner set forth is accomplished in the following manner:

The alternating current voltage applied to terminals 14 and 15 is fed to a miniature power supply generally denoted by the numeral 33 and includes a power transformer 34 having a primary 35 and a secondary 36 including a centertap 37. This transformer has substantially the same characteristics as the transformer 10 but since it is fundamentally a voltage generator and does not have to handle any appreciable current, it can be made relatively small. The output of the secondary 36 is rectified by silicon rectifiers 38 and 39 and the rectified voltage is applied between conductors 40 and 41 which are negative and positive respectively. The conductor 41 is connected to the centertap 37, while the centertap is connected to the junction of the two rectifiers 38 and 39. A bleeder resistor 42 is connected between the conductors 40 and 41 and the voltage developed across this resistor and its wave form is substantially identical to the voltage and wave form that would appear across conductors 20 and 21 if the silicon controlled rectifiers 16 and 17 were not in circuit with the primary 11 of the transformer 10. The positive conductor 41 of this supply 33 is connected to the positive conductor 21 of the minimum D.C. supply. The conductor 40 is fed through a resistor 43 and a diode 44 to the base 45 of a transistor 46. The transistor 46 in this embodiment of the invention is of the NPN type and the emitter 47 is connected via the conductor 48 to the negative side of the reference supply 49. This reference supply produces a voltage substantially equal to V previously described.

The positive side of the reference voltage is connected by conductor 50 to the conductor 24. With this arrangement it will be observed that if the terminal 22 of the main supply is considered at ground potential, then the emitter 47 of transistor 46 is at a potential equal to the supply potential between terminals 22 and 25 plus the V reference voltage 49.

With the foregoing arrangement, the transistor 46 will be conductive when the voltage applied to the base 45 is less negative than the voltage on the emitter 47. In other words, the base 45 is now positive with respect to the emitter 47. The collector 51 of the transistor 46 is connected to one side of the primary 52 of the pulse transformer 53. The other side of the primary 52 is connected to the collector 54 of transistor 55, while the emitter 56 is connected via the lead 57 to the supply conductor 24.

If the transistor 55 was always in a conducting state, it would then follow that the transistor 46 would be operated to conduct at the beginning of each half cycle as shown in curve A of FIG. 2. To prevent this, the transistor 55 is operated so that it will only conduct during the latter half of each half cycle of the curve A as shown in FIG. 2. This end is attained by a third power supply generally denoted by the numeral 58. This supply includes a transformer 59 having a primary 60 energized by the alternating current applied to terminals 14 and 15. The secondary 61 has a centertap 62 connected to conductor 63 and a pair of rectifiers 64 and 65 are arranged for full wave rectification and connected to the conductor 66. A bleeder resistor 67 is connected across the conductors 66 and 63. A condenser 68 is connected in series with a negative conductor, while the output of the condenser 68 is connected via the resistor 69 to the conductor 63. The junction of the condenser 68 and the resistor 69 is connected via the conductor 70 to the base 71 of the transistor 55. The condenser 68 is of relatively small value and it, together with the resistor 69, constitutes a differentiating circuit. Since each rectified half wave is differentiated, a voltage will appear on the conductor 70 as illustrated at B in FIG. 2. It will be observed that the differentiated signal is "0" when each half cycle is at its peak voltage. Since the transistor 55 is of the PNP type, it will conduct only when the base 71 is negative with reference to the emitter 56. This can occur only during the latter half of each half cycle as illustrated in curve B of FIG. 2. Since the transistor 55, which may be called an inhibitor transistor, conducts only after each rectified half wave passes through its peak value, and since the transistor 46 will conduct only when the base 45 is equal to or slightly less than $E_0$ plus $\Delta V$, current will not flow through the primary of the transformer 52 until these conditions are satisfied. When the conditions are satisfied, a pulse is introduced into the secondary windings 72 and 73 of the pulse transformer 53. The secondary 72 is connected to terminals $x$—$x$ on the rectifier 16 while the winding 73 is connected to terminals $y$—$y$ on rectifier 17. By properly phasing the windings 72 and 73, the pulses will be applied to cause the rectifiers 16 and 17 to conduct at predetermined points between 90° and 180° and 270° and 360° of each alternating current cycle.

In order to minimize any differences that might exist between the primary power supply and the power supply 33 and to effect more accurate control of the firing points of the silicon controlled rectifiers 16 and 17, a resistor 74 is connected between the junction of the diode 44 and resistor 43 and the lead 20. Under this condition, if the voltage applied to the base 45 of the transistor 46 is identical to the voltage appearing on the lead 20, the control circuit will operate in the normal manner. If the voltage on the lead 20 should, for any reason whatsoever, increase, it will tend to raise the voltage at the base 45 and thereby prevent the transistor 46 from becoming conductive until the voltage on the conductor 20 has dropped to some value below the so-called normal value. Because of the resistor 74, the voltage at the junction 75 will only be partially influenced by the voltage on the conductor 20 so that the voltage applied to the base of transistor 46 will be a function of the magnitude of the both voltages applied to the point 75. In this way, a feedback arrangement is provided which tends to afford improved stabilization for the circuit.

It will be observed that with the circuit as described above, alternating current is applied to the primary 11 of the transformer 10 at selected points on each half cycle that will impart a charge to the condenser 32 that is equal to or only slightly greater than the sum of the regulated output voltage plus $\Delta V$, and this holds notwithstanding the magnitude of the regulated output voltage appearing across terminals 22 and 25.

In actual tests with the supply as described above, and with the condenser 32 having a capacity in the range of 50,000 to 100,000 microfarads, a regulated D.C. output power of the order of two kilowatts has been attained and it is evident that this same system can be utilized for developing regulated direct current having even larger power capabilities. It is also clear when considering current requirements of the order of 50 to 100 amperes that the advantage gained by regulating the voltage applied to the condenser 32 so that it will be charged only to a voltage equal to or slightly greater than the regulated D.C. output voltage plus the loss in the series regulator 23 is substantial. Under these conditions, a series pass regulator need only have sufficient impedance variation to remove the ripple voltage on conductor 20 and possibly a small additional variation to effect some slight regulation of the output voltage. The range variations in the output voltage are automatically compensated by substantially instantaneous activation of the rectifiers 16 and 17 so that they will fire at selected portions of each half cycle to maintain a predetermined voltage on the conductor 20. Furthermore, the power transformer 10 when utilized in accordance with this invention, need only have about one-half the volume of a power transformer to which the full alternating current cycle is applied for equivalent D.C. power output.

It will be observed that the inhibiting circuit prevents the silicon controlled rectifiers from firing and in pressing a voltage on the primary of transformer 10 for the first 90° of each half cycle. The flux density in the core is thereby reduced by a factor of 2 if considered in view of standard transformer design. Since the transformer is designed to operate with normal flux densities, it would therefore require only one-half the core cross-sectional area, thereby reducing the total transformer volume approximately in half. The mean length of turn of each winding is also reduced by reason of the reduction of core cross-sectional area. Transformer losses therefore are substantially reduced since the core loss is reduced by a factor of approximately 2 and the copper loss by reason of the reduction of the mean length of turn is reduced approximately 15% to 25%.

When the power transformer 10 is used, it is of course desirable to utilize the silicon controlled rectifiers 16 and 17 in series with the primary winding 11 as shown in FIG. 1. It is also evident, however, that controlled rectifiers may be utilized in place of the rectifiers 18 and 19, and then apply the tripping signals to these rectifiers to control the peak value of the voltage applied to the condenser 32 in the same manner as described in connection with the rectifiers 16 and 17.

While transistors have been described in connection with the illustrated embodiment of the invention, it is evident that excellent operation can be attained by the utilization of vacuum tubes, as for instance, thyratrons may be used in place of silicon control rectifiers and appropriate electron tubes may be used in place of conventional rectifiers and the transistors illustrated in the drawings. For the purpose of the claims, the term electron device will be utilized to comprehend any type of electron control type including both transistors and vacuum tubes and the term rectifier shall comprehend any type of rectifying device.

While only one embodiment of the invention has been illustrated and described, it is understood that alterations, changes and modifications may be made without departing from the true scope and spirit thereof.

What is claimed is:

1. A voltage regulator comprising a power transformer having a primary winding and secondary winding, rectifier means connected to said secondary, at least one filter condenser connected to said rectifier means, switch means connected in series with said primary winding to control the application of alternating current energy thereto, said transformer and rectifier means applying interrupted direct current to said condenser, output means including terminals connected to said condenser for applying direct current energy to a load, second transformer and rectifier means energized by said alternating current and producing interrupted D.C. voltage, means including a differentiating network for producing a voltage corresponding to the differential of the last said interrupted D.C. voltage, control means connected to and energized by said second transformer and rectifier means, and said differentiating means whereby said control means is activated only during the latter half of each alternating current cycle, connections between said terminals and said switch means, said control means being responsive to an increase in the magnitude of the voltage on said terminals to delay the closure of said switch means and responsive to a decrease in the magnitude of the last said voltage to advance closure of said switch means.

2. A voltage regulator according to claim 1 wherein said output means includes regulating means connected between said condenser and said terminals, means responsive to the voltage across said terminals and producing an error signal, and means feeding said error signal to said regulator to maintain the voltage at said output terminals at a selected magnitude.

3. A power supply comprising a first power transformer having primary and secondary windings, means including a pair of controlled rectifiers connected in back-to-back relationship for and in series with said primary winding, a full wave rectifier connected to said secondary winding to produce a pulsed unidirectional voltage, at least one condenser connected to said full wave rectifier, a regulator having an input connected to said condenser and an output, said regulator developing a output voltage equal to the difference between the voltage across said condenser and the voltage loss in said regulator, a second power transformer, full wave rectifier means connected to the last said transformer and producing a second pulsed unidirectional voltage corresponding in phase and magnitude to the first said pulsed voltage, means producing a third voltage constituting the differential of said second voltage, a reference voltage generator generating a constant reference voltage corresponding in magnitude to a selected voltage drop across said regulator, connections between said reference generator and said regulator output to produce a sum voltage, an electron device connected to said sum voltage and said second unidirectional voltage and becoming conductive when said unidirectional voltage is approximately equal to and does not materially exceed said sum voltage, a second electron device connected to said differential voltage and becoming conductive when the slope of said second pulsed voltage is negative, a pulsing transformer connected to said electron devices and receiving an electric pulse when both devices become conductive, and connections between said pulse transformer and said controlled rectifiers to selectively fire said rectifiers during selected half cycles of said A.C. power.

4. A voltage regulated power supply comprising means including a pair of terminals and an electronic switch having means for rectifying an alternating current source, said switch producing direct current energy pulses across said terminals during time intervals when said switch is closed, said switch being automatically opened when each of said pulses terminates, an energy storing condenser connected across said terminals, a pair of output terminals, voltage regulating means connected between one of the first said terminals and an output terminal, a connection between the other output terminal and the other of the first said terminals, a network connected to said output terminals and producing an error signal, a connection between said network and said regulating means to feed said error signal to said regulator to maintain the voltage across said output terminals at a predetermined value, a reference source of unidirectional energy pulses synchronized with the first said pulses, a voltage comparator and pulse generator connected to said voltage regulating means and to said reference source and producing repetitive signal pulses when the output voltage from said regulating means falls below said reference source, gating means connected with said comparator-generator and synchronized with each of the first said pulses to interrupt each of said signal pulses until each of the first said pulses attains its peak value, and a connection between said comparator-generator and said electronic switch whereby said switch will be closed each time a signal pulse is applied thereto, thereby minimizing the voltage drop across said voltage regulating means.

5. A voltage regulator according to claim 4 wherein the first said means comprises a transformer having a primary winding adapted to be energized by alternating current and a secondary winding, rectifying means connected to said secondary winding and producing unidirectional energy pulses and said electronic switch comprises at least one silicon controlled rectifier connected in series with one side of said primary winding to control the application of alternating current thereto.

References Cited by the Examiner
UNITED STATES PATENTS

| 3,083,330 | 3/1963 | Roth et al. | 307—88.5 |
| 3,097,314 | 7/1963 | Harriman | 323—24 X |
| 3,114,873 | 12/1963 | Love | 323—22 |
| 3,116,446 | 12/1963 | Healey | 323—22 X |
| 3,152,296 | 10/1964 | Meszaros | 321—18 |
| 3,185,912 | 5/1965 | Smith et al. | 321—18 |
| 3,219,912 | 11/1965 | Harrison | 321—16 |

OTHER REFERENCES

"Power Supply Uses Switching Preregulation" by J. S. Riordon, printed in Electronics, March 9, 1962.

JOHN F. COUCH, *Primary Examiner.*

LLOYD McCOLLUM, *Examiner.*

J. M. THOMPSON, M. L. WACHTELL,
*Assistant Examiners.*